(12) United States Patent　　　(10) Patent No.: US 9,412,341 B2
Lin　　　　　　　　　　　　　　　　(45) Date of Patent: Aug. 9, 2016

(54) INFORMATION PROCESSING METHOD AND ELECTRONIC DEVICE

(71) Applicant: Lenovo (Beijing) Limited, Beijing (CN)

(72) Inventor: Gaofeng Lin, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 199 days.

(21) Appl. No.: 14/230,663

(22) Filed: Mar. 31, 2014

(65) Prior Publication Data

US 2015/0042674 A1　Feb. 12, 2015

(30) Foreign Application Priority Data

Aug. 12, 2013　(CN) .......................... 2013 1 0349602

(51) Int. Cl.
　　*G09G 5/00*　　(2006.01)
　　*G09G 5/14*　　(2006.01)
　　*G06F 1/16*　　(2006.01)
　　*G06F 1/32*　　(2006.01)

(52) U.S. Cl.
　　CPC ............. *G09G 5/14* (2013.01); *G06F 1/1652* (2013.01); *G06F 1/3265* (2013.01); *G06F 2203/04102* (2013.01); *G09G 2354/00* (2013.01); *G09G 2380/02* (2013.01); *Y02B 60/1242* (2013.01)

(58) Field of Classification Search
　　None
　　See application file for complete search history.

(56) References Cited

U.S. PATENT DOCUMENTS

| | | | |
|---|---|---|---|
| 8,810,627 B1 * | 8/2014 | Cho .................. | H04N 5/23238 348/38 |
| 2013/0229324 A1 * | 9/2013 | Zhang ...................... | G09G 5/00 345/1.3 |
| 2014/0028596 A1 * | 1/2014 | Seo ........................ | G06F 3/0487 345/173 |
| 2014/0029017 A1 * | 1/2014 | Lee ........................ | G01B 11/24 356/601 |
| 2014/0098034 A1 * | 4/2014 | Hack ..................... | G06F 1/1677 345/173 |

* cited by examiner

*Primary Examiner* — Peter Hoang
(74) *Attorney, Agent, or Firm* — Westman, Champlin & Koehler, P.A.

(57) ABSTRACT

The present invention discloses an electronic device and an information processing method in the electronic device. The electronic device comprises a flexible display unit on which a first content is displayed. The method comprises: detecting whether a preset deformation of the flexible display unit occurs; and when the preset deformation of the flexible display unit occurs, displaying a second content which may or may not be related to the first content on the flexible display unit.

16 Claims, 5 Drawing Sheets

Fig. 8

INFORMATION PROCESSING METHOD AND ELECTRONIC DEVICE

CROSS-REFERENCE TO RELATED APPLICATION

This application is a non-provisional application of Chinese Application No. CN 201310349602.3, filed Aug. 12, 2013, in Chinese, the contents of which are hereby incorporated by reference in their entirety.

TECHNICAL FIELD

The present invention relates to electronic technology, and particularly to information processing methods and electronic devices.

BACKGROUND

With development of science and technology, electronic technology has achieved rapid progress. There are various types of electronic products, and people enjoy convenience brought by the evolution of science and technology. Nowadays, by using various types of electronic devices, people can enjoy comfortable lives thanks to science and technology development.

For instance, flexible display technology has been widely used in people's lives. Electronic devices, such as tablet computers, smart mobile phones etc., with flexible display technology have a reduced size. Thus, space taken up by such electronic devices is reduced. They are more convenient for people to carry and use than general tablet computers and smart mobile phones.

However, when implementing solutions of embodiments of the present invention, the inventors found at least the following problems with the above-described technology.

When an electronic device manufactured with the flexible display technology is used, what often happens is that after part of the region of the flexible display unit is folded, it might become difficult for this region to be seen by a user. The electronic device is unable to detect that the flexible display unit has been folded, and thus still display an image on the whole flexible display unit without adaption to the folded status of the flexible display unit. At this time, the user may see an incomplete or distorted image, and thus may not have a good visual experience.

Therefore, there is a problem in the related art that the electronic device cannot detect that the flexible display unit has been folded, and thus an incomplete or distorted image may be displayed on the flexible display unit, leading to degraded user visual experience.

SUMMARY

Embodiments of the present invention provide an information processing method and electronic device in view of the problem in the related art that the electronic device cannot detect that the flexible display unit has been folded, and thus an incomplete or distorted image may be displayed on the flexible display unit, leading to degraded user visual experience.

The embodiments of the present invention provide an information processing method applied on an electronic device. The electronic device comprises a flexible display unit on which a first content is displayed. The method comprises: detecting whether a preset deformation of the flexible display unit occurs; when the preset deformation of the flexible display unit occurs, displaying, on the flexible display unit, a second content related or not related to the first content.

Preferably, said detecting whether a preset deformation of the flexible display unit occurs comprises: detecting whether a first deformation degree of the flexible display unit is larger than a first threshold and smaller than a second threshold, wherein a first preset deformation of the flexible display unit occurs when the first deformation degree is larger than the first threshold and smaller than the second threshold; or detecting whether a second deformation degree of the flexible display unit is larger than a third threshold which is larger than the second threshold, wherein a second preset deformation of the flexible display unit occurs when the second deformation degree is larger than the third threshold, and the flexible display unit is divided into a first region and a second region which is able to support the first region on a preset plane.

Preferably, when the first preset deformation of the flexible display unit occurs, displaying the second content on the flexible display unit comprises: displaying, on the flexible display unit, a prompt information indicating a bendable region.

Preferably, displaying the second content on the flexible display unit comprises: displaying, based on the first content, a first prompt information indicating a first bendable region on the flexible display unit; wherein, after the second preset deformation of the flexible display unit occurs along the first bendable region, at least part of the first content can be displayed in the first region.

Preferably, displaying the second content on the flexible display unit comprises: displaying, on the flexible display unit, a second prompt information indicating a second bendable region, the second prompt information corresponding to a first group of applications in the electronic device; wherein, after the second preset deformation of the flexible display unit occurs along the second bendable region, any application of the first group can be displayed in the first region.

Preferably, when the second preset deformation of the flexible display unit occurs, displaying the second content on the flexible display unit comprises: displaying, on the flexible display unit, the second content based on an angle between a first plane where the first region of the flexible display unit is located and a second plane where the second region of the flexible display unit is located.

Preferably, when the second preset deformation of the flexible display unit occurs, and the angle is smaller than 180°, displaying the second content on the flexible display unit comprises: displaying a first sub-content of the second content in the first region, and displaying a second sub-content of the second content in the second region, the first sub-content being different from the second sub-content.

Preferably, when the second preset deformation of the flexible display unit occurs, and the angle is larger than 180°, displaying the second content on the flexible display unit comprises: displaying at least part of the second content in the first region, and displaying nothing in the second region.

Preferably, said displaying nothing in the second region comprises: obtaining M sub-display units located in the second region, M being an integer larger than or equal to 1; and setting the M sub-display units to an off status so that nothing is displayed in the second region.

The embodiments of the present invention provide an electronic device, comprising: a housing; a flexible display unit provided on the housing, wherein a first content is displayed on the flexible display unit; and a processor provided inside the housing and connected to the flexible display unit, configured to detect whether a preset deformation of the flexible display unit occurs, and when the preset deformation of the flexible display unit occurs, display, on the flexible display unit, a second content related or not related to the first content.

Preferably, the processor is configured to detect whether a first deformation degree of of the flexible display unit is larger than a first threshold and smaller than a second threshold, wherein a first preset deformation of the flexible display unit occurs when the first deformation degree is larger than the first threshold and smaller than the second threshold; or detect whether a second deformation degree of the flexible display unit is larger than a third threshold which is larger than the second threshold, wherein a second preset deformation of the flexible display unit occurs when the second deformation degree is larger than the third threshold, and the flexible display unit is divided into a first region and a second region which is able to support the first region on a preset plane.

Preferably, the processor is configured to display, on the flexible display unit, a prompt information indicating a bendable region.

Preferably, the processor is configured to display, based on the first content, a first prompt information indicating a first bendable region on the flexible display unit, wherein, after the second preset deformation of the flexible display unit occurs on along the first bendable region, at least part of the first content can be displayed in the first region.

Preferably, the processor is configured to display, on the flexible display unit, a second prompt information indicating a second bendable region, the second prompt information corresponding to a first group of applications in the electronic device; wherein after the second preset deformation of the flexible display unit occurs along the second bendable region, any application of the first group can be displayed in the first region.

Preferably, the processor is configured to display the second content on the flexible display unit based on an angle between a first plane where the first region of the flexible display unit is located and a second plane where the second region of the flexible display unit is located.

Preferably, when the second preset deformation of the flexible display unit occurs, and the angle is smaller than 180°, the processor is configured to display a first sub-content of the second content in the first region, and display a second sub-content of the second content in the second region, the first sub-content being different from the second sub-content.

Preferably, when the second preset deformation of the flexible display unit occurs, and the angle is larger than 180°, the processor is configured to display at least part of the second content in the first region, and display nothing in the second region.

Preferably, the processor is configured to obtain M sub-display units located in the second region, M being an integer larger than or equal to 1, and set the M sub-display units to an off status so that nothing is displayed in the second region.

One or more solutions according to the embodiments of the present invention have at least the following advantages.

1. With the solution of detecting whether a preset deformation of the flexible display unit occurs, and when the preset deformation of the flexible display unit occurs, displaying a second content on the flexible display unit, the disadvantage can be avoided that the user cannot see a complete image due to the folded flexible display unit. After detecting a preset deformation of the flexible display unit occurs, a second content is displayed on the flexible display unit, and the second content is obtained by adjusting the first content based on the preset deformation. This solves the problem in the related art that the electronic device cannot detect that the flexible display unit has been folded, and thus an incomplete or distorted image may be displayed on the flexible display unit, leading to degraded user visual experience. Thus, the solution achieves the effect of providing to the user a complete image and improving the visual experience of the user.

2. With the solution of detecting whether a first deformation degree of of the flexible display unit is larger than a first threshold and smaller than a second threshold, and if so, displaying a prompt information to the user to indicate a bendable region, it is possible to, when a first preset deformation of the flexible display unit occurs, display on the flexible display unit a prompt information indicating a corresponding bendable region. Thus, the user can have user a good visual experience when the second region support the first region on a preset plane.

3. With the solution of detecting whether a second deformation degree of the flexible display unit is larger than a third threshold, and if so (that is, when a second preset deformation of the flexible display unit occurs), displaying the second content on the flexible display unit, it is possible to provide to the user a complete image and improve the visual experience of the user.

4. With the solution of displaying nothing on the second region when a second preset deformation of the flexible display unit occurs, and an angle between a first plane where the first region is located and a second plane where the second region is located is larger than 180°, it is possible to reduce power consumption and extend the lifetime of the electronic device.

DETAILED DESCRIPTION OF THE EMBODIMENTS

Embodiments of the present invention provide an information processing method and electronic device in view of the problem in the related art that the electronic device cannot detect that the flexible display unit has been folded, and thus an incomplete or distorted image may be displayed on the flexible display unit, leading to degraded user visual experience.

The solutions according to the embodiments of the present invention are provided to solve the above problem. The general idea is as follows.

An embodiment of the present invention provides an information processing method applied on an electronic device. The electronic device comprises a flexible display unit on which a first content is displayed. The method comprises:

first, detecting whether a preset deformation of the flexible display unit occurs, e.g. whether the flexible display unit is bent or folded;

second, if the preset deformation of the flexible display unit occurs, displaying on the flexible display unit a second content, which may be obtained by adjusting display signals provided to the flexible display unit by the electronic device to adapt to the flexible display unit with the preset deformation, the second content may or may not be related to the first content.

It can be seen that, with the solution of detecting whether a preset deformation of the flexible display unit occurs, and when the preset deformation of the flexible display unit occurs, displaying a second content on the flexible display unit, the disadvantage can be avoided that the user cannot see a complete image due to the folded flexible display unit. After detecting a preset deformation of the flexible display unit occurs, a second content is displayed on the flexible display unit, and the second content is obtained by adjusting the first content based on the preset deformation. This solves the problem in the related art that the electronic device cannot detect that the flexible display unit has been folded, and thus an incomplete or distorted image may be displayed on the flexible display unit, leading to degraded user visual experience. Thus, the solution achieves the effect of providing to the user a complete image and improving the visual experience of the user.

For a better understanding of the solution discussed above, the solution will be explained in detail in connection with figures and specific implementations.

The present invention provides an information processing method applied on an electronic device. The electronic device includes a flexible display unit on which a first content is displayed. In practical applications, the electronic device may be an electronic device manufactured with flexible display technology, such as a tablet computer, a smart mobile phone, etc., which is not limited herein.

Figure 1:
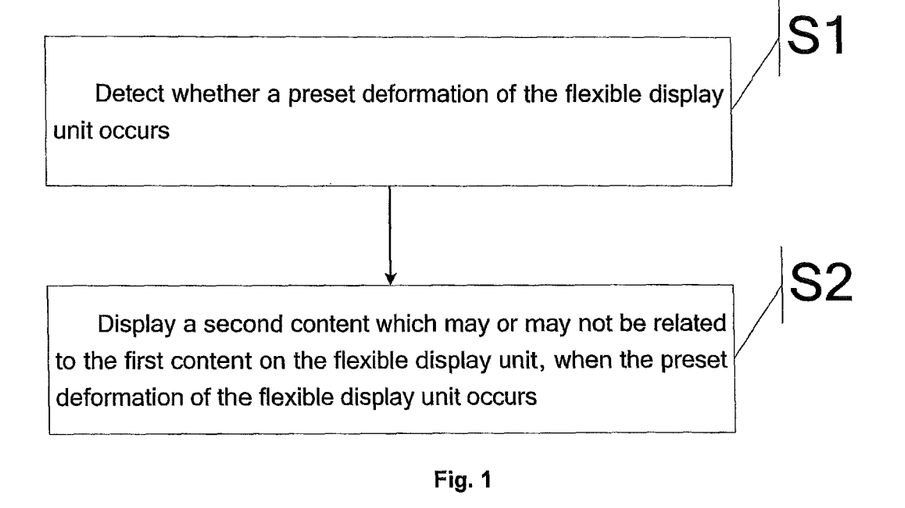
FIG. 1 is a flow chart of an information processing method according to an embodiment of the present invention.

FIG. 1 is a flow chart of the information processing method according to an embodiment of the present invention. The method includes:

S1: detecting whether a preset deformation of a flexible display unit occurs;

S2: if so, displaying on the flexible display unit a second content which may or may not be related to the first content.

Figure 2A:
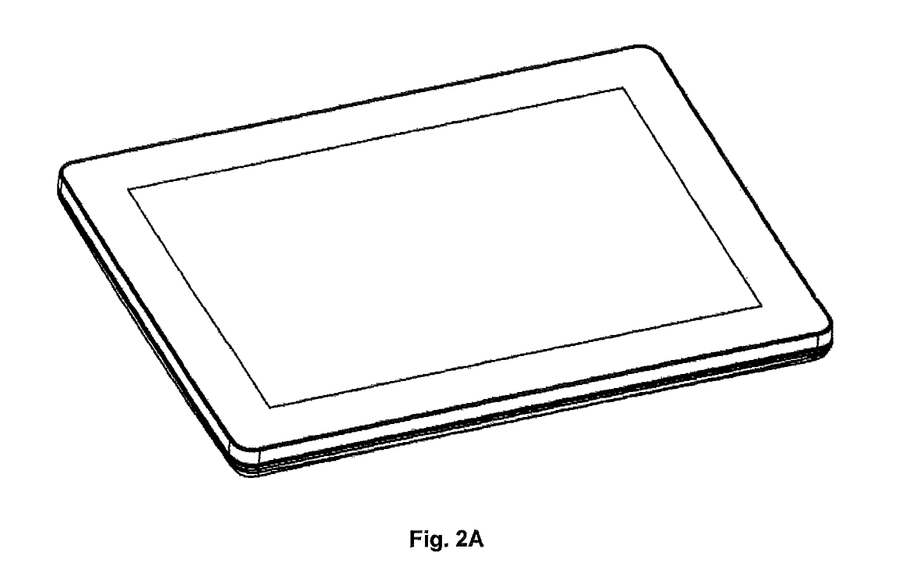
FIG. 2A is a schematic diagram of a tablet computer according to an embodiment of the present invention.

In the following, a tablet computer as an example of the electronic device will be exemplified in detail. FIG. 2A is a schematic diagram of a tablet computer manufactured withy flexible display technology according to an embodiment of the present invention. The information processing method according to an embodiment of the present invention may be applied in the tablet computer in FIG. 2A.

In Step S1, whether a preset deformation of the flexible display unit occurs is detected. Specifically, multiple pressure sensing units may be provided in the flexible display unit. The multiple pressure sensing units are used to detect whether the preset deformation of the flexible display unit occurs.

In practical applications, the pressure sensing units may convert a pressure generated when the preset deformation occurs into an electric signal by using a piezoelectric sensor. The pressure generated when the preset deformation of the flexible display unit occurs may be transmitted through a pressure fiber to a pressure sensor. The pressure sensor generates an electric signal based on the pressure value. The electronic device may detect whether the preset deformation of the flexible display unit occurs based on the electric signal. To be noted, the pressure refers to a pressure applied on the pressure sensing units by the flexible display unit when the preset deformation thereof occurs, rather than any pressure on the flexible display unit from outside. For example, when the user presses the tablet computer of FIG. 2A against the desktop, the pressure sensing units in the tablet computer may not sense any pressure if no deformation occurs in the tablet computer.

In addition to the two schemes illustrated above, based on the teaching of the present embodiment, those skilled in the art can use other suitable schemes to detect if a preset deformation of the flexible display unit occurs depending on requirements of actual applications. Description thereof is omitted here.

Figure 2B:
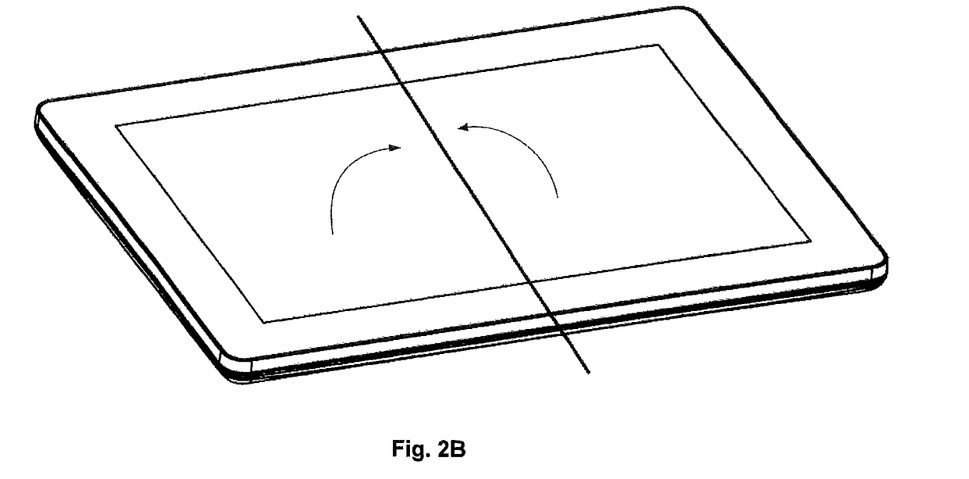
FIGS. 2B and 2C are schematic diagrams of two types of deformations of a tablet computer according to an embodiment of the present invention.
Figure 2C:
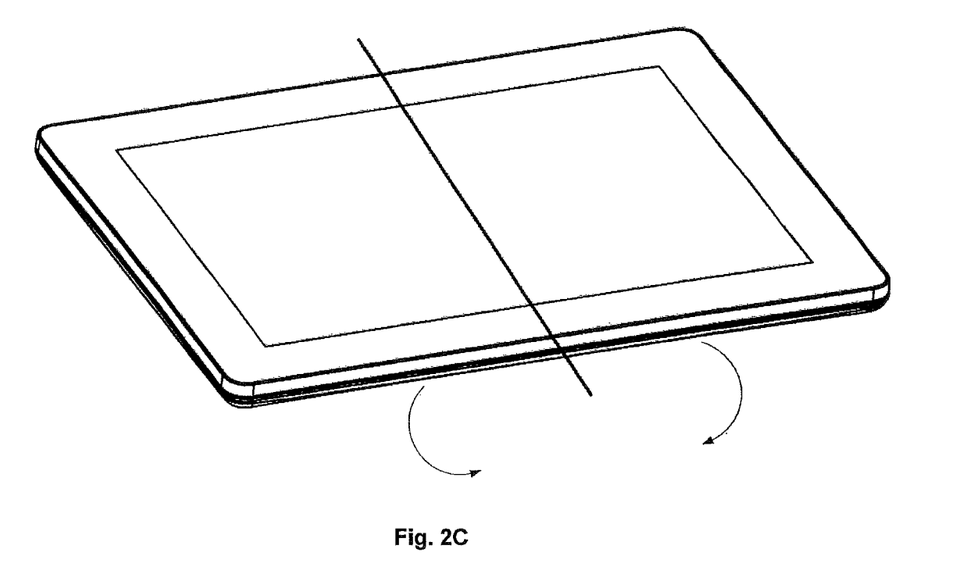

FIGS. 2B and 2C are schematic diagrams of two types of deformations of an electronic device according to an embodiment of the present invention. With the preset deformation, the flexible display unit is divided into a first region and a second region. The first type of deformation is shown in FIG. 2B where the first region and the second region move towards each other. The second type of deformation is shown in FIG. 2B where the first region and the second region move away from each other.

In a specific implementation, for accurately providing to the user a desired image depending on the type of deformation of the flexible display unit, in Step S1, detecting whether a preset deformation of the flexible display unit occurs may include the following two scenarios.

First Scenario

Whether a first deformation degree of the flexible display unit is larger than a first threshold and smaller than a second threshold is detected. Here, a first preset deformation of the flexible display unit occurs when the first deformation degree is larger than the first threshold and smaller than the second threshold.

Specifically, the flexible display unit can be bent easily due to its flexibility. If the degree of bending is smaller than the first threshold, the user's visual experience will not be affected, and it is unnecessary to adjust the content displayed on the flexible display unit.

For example, the first threshold is set to 5°, and the second threshold is set to 30°. After the deformation occurs in the flexible display unit, whether the first deformation degree of the flexible display unit is larger than 5° and smaller than 30° is detected. If the degree is smaller than 5°, this deformation does not satisfy the first preset deformation condition, and the user's visual experience will not be affected. It is thus unnecessary to adjust the first content displayed on the flexible display unit with respect to this deformation.

If the first deformation degree of the flexible display unit is larger than 5° and smaller than 30°, the deformation of the flexible display unit satisfies the first preset deformation condition. This deformation shows that the user wants to bend the flexible display unit for use. At this time, a prompt information indicating a bendable region may be presented to the user. It notifies the user that a better user experience can be obtained if he or she bends the flexible display unit along the bendable region.

Second Scenario

Whether a second deformation degree of the flexible display unit is larger than a third threshold is detected. Here, a second preset deformation of the flexible display unit occurs when the second deformation degree of the flexible display unit is larger than the third threshold. The flexible display region is divided into a first region and a second region. The second region can support the first region on a preset plane. The third threshold is larger than the second threshold.

Specifically, when the second deformation degree of the flexible display unit is larger than the third threshold, e.g. 60°, it indicates that this deformation of the flexible display unit satisfies the second preset deformation condition. This deformation of the flexible display unit may affect the user's viewing of the image. Thus, it is necessary to adjust the first content displayed on the flexible display unit.

As above described, when the degree of deformation of the flexible display unit is larger than the first threshold but smaller than the second threshold, the user's viewing of the image will not be affected, and the user may want to bend the flexible display unit for use. At this time, a prompt information indicating a bendable region may be presented to the user. It notifies to the user that a better user experience may be obtained by bending the flexible display unit along the bendable region. When the degree of deformation of the flexible display unit is larger than the third threshold, it indicates that this deformation of the flexible display unit may affect the user's viewing of the image. Thus, it is necessary to adjust the first content displayed on the flexible display unit.

Values of the first threshold, the second threshold, and the third threshold illustrated in the embodiment are only examples. They are used to explain the present invention in detail, rather than for limitation. Based on the teaching of the present embodiment, those skilled in the art can set the first threshold, the second threshold, and the third threshold to any appropriate values to satisfy the requirements of actual situations. Description thereof will be omitted herein.

When the degree of deformation of the flexible display unit is larger than the first threshold but smaller than the second threshold, that is, when a first preset deformation occurs in the flexible display unit, prompt information may be presented to the user as in the following two cases.

Case 1:

A first prompt information indicating a first bendable region is displayed on the flexible display unit, based on the first content displayed on the flexible display unit. When a second preset deformation of the flexible display unit occurs along the first bendable region, at least part of the content displayed on the flexible display unit may be displayed in the first region.

Specifically, for example, the first content displayed on the flexible display unit is a full-screen video. The user wants to bend the flexible display unit, so that the first region is for playing video and the second region is for supporting the first region on a preset surface, e.g. a desktop. In this way, the user does not have to hold the tablet computer to watch the video, or use any support mechanism to support the tablet computer on the desktop.

Figure 3:
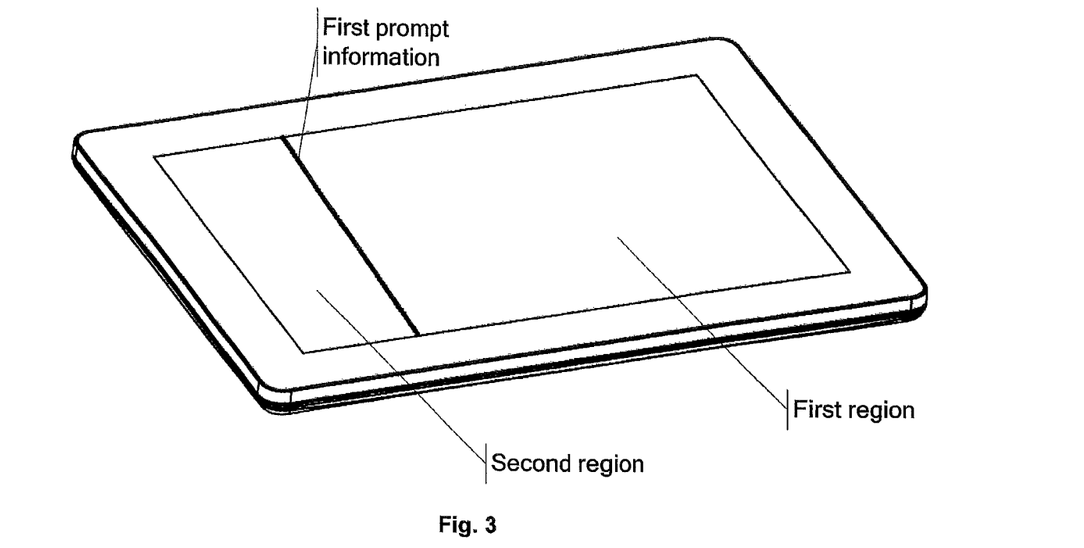
FIG. 3 is a schematic diagram of a first prompt information having a first type according to an embodiment of the present invention.

As the user bends the flexible display unit, the flexible display unit is deformed. When a first preset deformation occurs in the flexible display unit, a first prompt information, e.g. a stripe, may be displayed on the flexible display unit. FIG. 3 is a schematic diagram of the first prompt information of a first type according to an embodiment of the present invention. It indicates that if the second preset deformation occurs in the flexible display unit along the stripe, the second region can support the first region on the desktop, and the first region has the maximal display region to play the video. This improves the user's visual experience.

Figure 4:
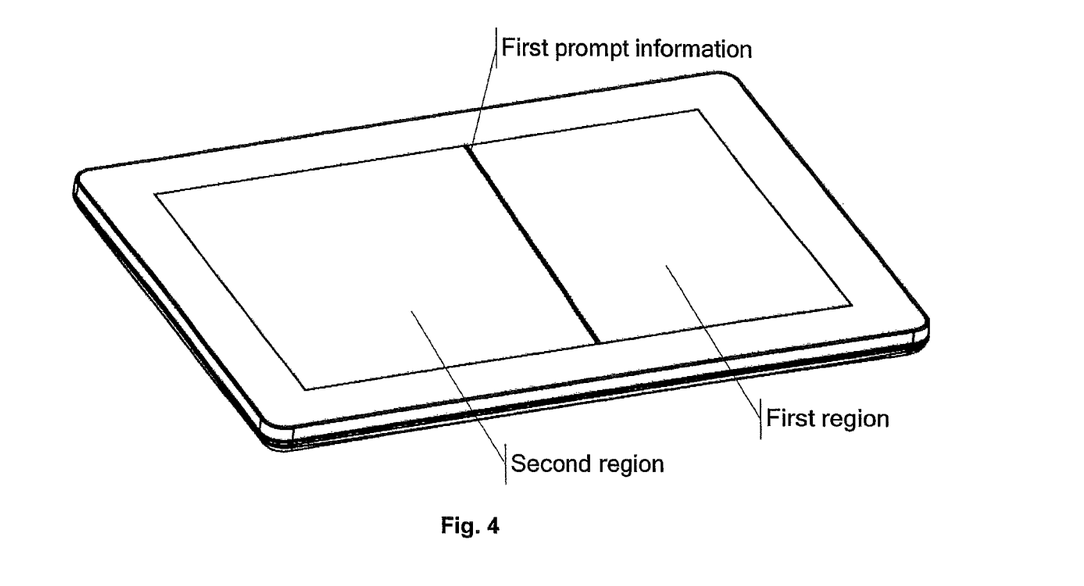
FIG. 4 is a schematic diagram of a first prompt information having a second type according to an embodiment of the present invention.

If the first content displayed on the flexible display unit is a system desktop of the tablet computer, and a window for a clock or a weather forecast is displayed on the desktop, the position of the stripe corresponding to the first prompt information displayed on the flexible display unit is different from that in FIG. 3. FIG. 4 is a schematic diagram of the first prompt information of a second type according to an embodiment of the present invention. Because the a window for a clock or a weather forecast is small, the user does not need a large display region for such window, as long as the time or weather displayed in the first region can be seen clearly.

The above two types are examples of the first prompt information displayed on the flexible display unit to notify the user of a preferred bendable region based on the first content. In real applications, those skilled in the art can display prompt information on the flexible display unit specifically based on the first content so that the first region can display the first content with the largest display region and bring to the user better visual experience, while the second region can support the first region on a preset surface.

Case 2:

A second prompt information indicating a second bendable region is displayed on the flexible display unit. The second prompt information corresponds to a first group of applications in the electronic device. After the second preset deformation occurs in the flexible display unit along the second bendable region, any application in the first group can be displayed in the first region.

Figure 5:
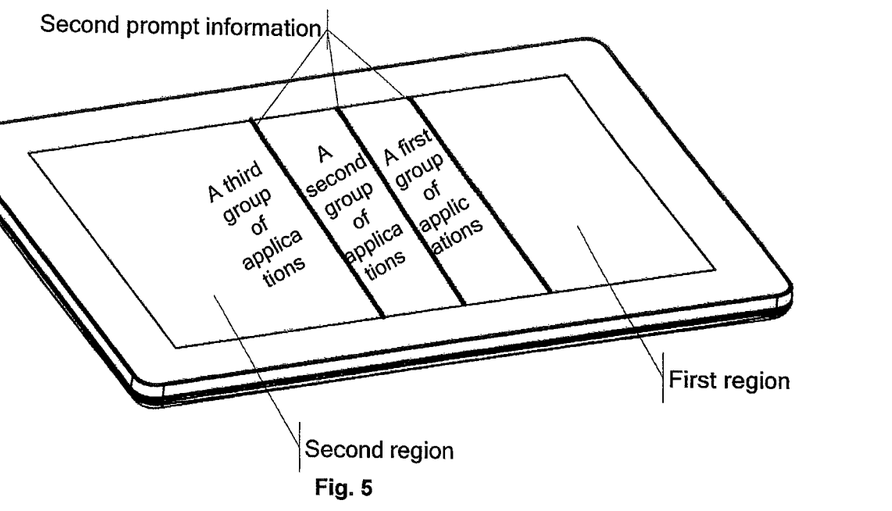
FIG. 5 is a schematic diagram of a second prompt information according to an embodiment of the present invention.

Specifically, FIG. 5 is a schematic diagram of the second prompt information according to an embodiment of the present invention. As shown in FIG. 5, the second prompt information indicates the second bendable region, and corresponds to the first group of applications in the electronic device. The second prompt information may include multiple sub-information each corresponding to one or a group of application(s) in the tablet computer.

Regarding the second bendable region indicated by the second prompt information, the following two aspects are considered including: the size of the display region required for displaying the first group of applications corresponding to the second prompt information; and the second region being capable of supporting the first region on a preset surface after the flexible display unit is bent. Those skilled in the art may set corresponding prompt information for different applications based on the teaching of the present embodiment. Description thereof will be omitted here.

When the second preset deformation occurs in the flexible display unit along the second bendable region, an application corresponding to the second prompt information will be displayed in the first region after the flexible display unit is bent. This can achieve an effect of switching applications when the second preset deformation of the flexible display unit occurs. After the second preset deformation occurs in the flexible display unit, the second region can support the first region on a preset surface. This avoids inconvenience caused by using an additional support mechanism.

The above describes, when the first preset deformation of the flexible display unit occurs, presenting to the user a prompt information of two different types. In real applications, those skilled in the art may use any proper method to present to the user a prompt information based on actual conditions according to the teaching of the embodiment, and satisfy requirements of real applications.

In the following, description will be made of, when the second preset deformation occurs in the flexible display unit, how to adjust the content displayed on the flexible display unit to bring a good visual experience to the user.

In specific implementations, when the second preset deformation occurs in the flexible display unit, the second content may be displayed on the flexible display unit according to an angle between a first plane where the first region is located and a second plane where the second region is located.

When the second preset deformation occurs in the flexible display unit, there are two types of deformations for the first region and the second region, as shown in FIGS. 2B and 2C. For the first type of deformation, the first region and the second region move towards each other, while for the second type of deformation, the first region and the second region move apart from each other.

Figure 6:
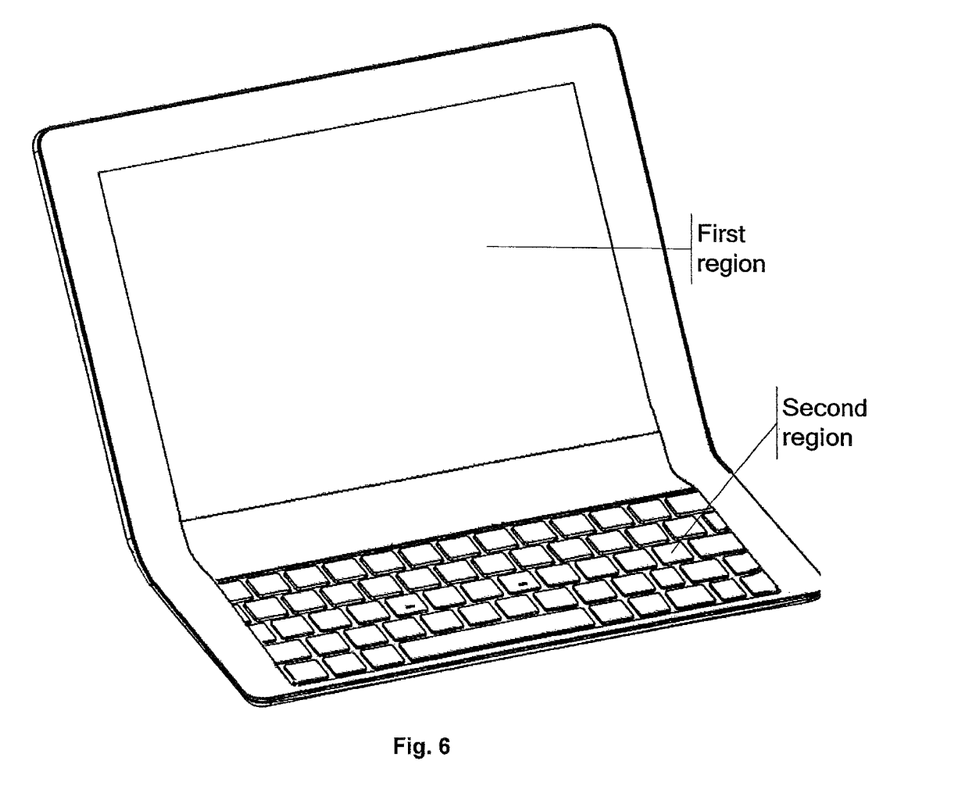
FIG. 6 is a schematic diagram of a second preset deformation of a flexible display unit occurring in a first situation according to an embodiment of the present invention.

FIG. 6 is a schematic diagram of the second preset deformation having a first type of a flexible display unit. As shown in FIG. 6, when the first type of the second preset deformation occurs in the flexible display unit, the angle between a first plane where the first region is located and a second plane where the second region is located is smaller than 180°. Meanwhile, the first sub-content of the second content is displayed in the first region, and the second sub-content of the second content is displayed in the second region. The first sub-content displayed in the first region is different from the second sub-content displayed in the second region.

In the scenario shown in FIG. 6, the flexible display unit is folded into a structure similar to a notebook computer being in operation. The first sub-content displayed in the first region may be an interface of a tablet computer, for example, a document editing interface. The second sub-content displayed in the second region may be a virtual keyboard, which can facilitate the user to edit a document or enter other interaction instructions in the document editing interface. This will satisfy the user's requirement for using a notebook computer.

Figure 7:
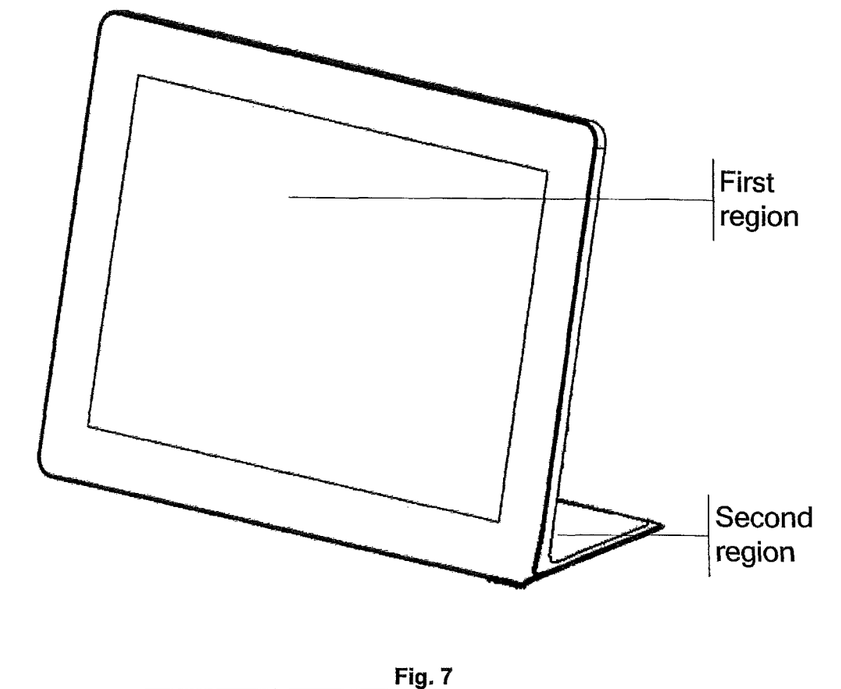
FIG. 7 is a schematic diagram of a second preset deformation of a flexible display unit occurring in a second situation according to an embodiment of the present invention.

FIG. 7 is a schematic diagram of the second type of the second preset deformation in a flexible display unit. As shown in FIG. 7, when the second type of the second preset deformation occurs in the flexible display unit, the angle between a first plane where the first region is located and a second plane where the second region is located is larger than 180°. The second region supports the first region on the preset surface, e.g. a desktop. In this case, at least part of the second content may be displayed in the first region, but nothing is displayed in the second region.

Specifically, because the second region is adjacent to the desktop and may not provide any image to the user, an image of pure black or other colors may be displayed in the second region. An image the user wants to see (Le, part of the second content) may be displayed in the first region.

To reduce the power consumption of the table computer, the display of the second region may be directly turned off, and thus no image will be shown in the second region. In this case, the whole second content will be displayed in the first region.

When the second type of the second preset deformation occurs in the flexible display unit, the tablet computer obtains M sub-display units in the second region, M being greater than or equal to 1. Then the M sub-display units are set to an off status, and thus nothing is presented in the second region.

Specifically, the flexible display unit includes multiple sub-display units, and each of them may control a display corresponding to one or more pixel(s) on the flexible display unit. By setting the M sub-display units in the second preset region to an off status, no display is in the second region. Power consumption of the tablet computer may be reduced and lifetime thereof may be increased.

As above described, with the solution of detecting whether a preset deformation of the flexible display unit occurs, and when the preset deformation of the flexible display unit occurs, displaying a second content on the flexible display unit, the disadvantage can be avoided that the user cannot see a complete image due to the folded flexible display unit. After detecting a preset deformation of the flexible display unit occurs, a second content is displayed on the flexible display unit, and the second content is obtained by adjusting the first content based on the preset deformation. This solves the problem in the related art that the electronic device cannot detect that the flexible display unit has been folded, and thus an incomplete or distorted image may be displayed on the flexible display unit, leading to degraded user visual experience. Thus, the solution achieves the effect of providing to the user a complete image and improving the visual experience of the user.

Further, with the solution of detecting whether a first deformation degree of of the flexible display unit is larger than a first threshold and smaller than a second threshold, and if so, displaying a prompt information to the user to indicate a bendable region, it is possible to, when a first preset deformation of the flexible display unit occurs, display on the flexible display unit a prompt information indicating a corresponding bendable region. Thus, the user can have user a good visual experience when the second region support the first region on a preset plane.

Further, with the solution of detecting whether a second deformation degree of the flexible display unit is larger than a third threshold, and if so (that is, when a second preset deformation of the flexible display unit occurs), displaying the second content on the flexible display unit, it is possible to provide to the user a complete image and improve the visual experience of the user.

Further, with the solution of displaying nothing on the second region when a second preset deformation of the flexible display unit occurs, and an angle between a first plane where the first region is located and a second plane where the second region is located is larger than 180°, it is possible to reduce power consumption and extend the lifetime of the electronic device.

Figure 8:
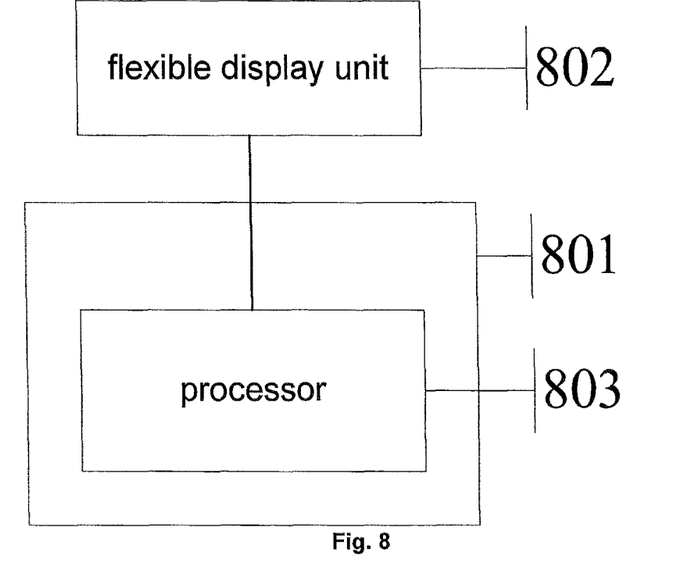
FIG. 8 is a diagram showing functional modules of an electronic device according to an embodiment of the present invention.

Based on the same inventive concept, an electronic device is provided according to an embodiment of the present invention. FIG. 8 is a diagram showing functional modules in an electronic device according to an embodiment of the present invention. As shown in FIG. 8, the electronic device includes: a housing 801; a flexible display unit 802 disposed on the housing 801, a first content is displayed on the flexible display unit 802; a processor 803 disposed in the housing 801 and connected to the flexible display unit 802, configured to detect whether a preset deformation of the flexible display unit 802 occurs, and if so, displaying, on the flexible display unit 802, a second content which may or may not be related to the first content.

In a specific implementation, the processor 803 is configured to detect whether a first deformation degree of the of the flexible display unit 802 is larger than a first threshold and smaller than a second threshold, wherein a first preset deformation of the flexible display unit 802 occurs when the first deformation degree is larger than the first threshold and smaller than the second threshold; or detect whether a second deformation degree of the flexible display unit 802 is larger than a third threshold which is larger than the second threshold, wherein a second preset deformation of the flexible display unit 802 occurs when the second deformation degree is larger than the third threshold, and the flexible display unit 802 is divided into a first region and a second region which is able to support the first region on a preset plane.

In a specific implementation, the processor 803 is configured to display, on the flexible display unit 802, a prompt information indicating a bendable region.

In a specific implementation, the processor 803 is configured to display, based on the first content, a first prompt information indicating a first bendable region on the flexible display unit 802, wherein, after the second preset deformation of the flexible display unit 802 occurs on along the first bendable region, at least part of the first content can be displayed in the first region.

In a specific implementation, the processor 803 is configured to display, on the flexible display unit 802, a second prompt information indicating a second bendable region, the second prompt information corresponding to a first group of applications in the electronic device; wherein after the second preset deformation of the flexible display unit 802 occurs along the second bendable region, any application of the first group can be displayed in the first region.

In a specific implementation, the processor 803 is configured to display the second content on the flexible display unit 802 based on an angle between a first plane where the first region of the flexible display unit 802 is located and a second plane where the second region of the flexible display unit 802 is located.

In a specific implementation, when the second preset deformation of the flexible display unit 802 occurs, and the angle is smaller than 180°, the processor 803 is configured to display a first sub-content of the second content in the first region, and display a second sub-content of the second content in the second region, the first sub-content being different from the second sub-content.

In a specific implementation, when the second preset deformation of the flexible display unit 802 occurs, and the angle is larger than 180°, the processor 803 is configured to display at least part of the second content in the first region, and display nothing in the second region.

In a specific implementation, the processor 803 is configured to obtain M sub-display units located in the second region, M being an integer larger than or equal to 1, and set the M sub-display units to an off status so that nothing is displayed in the second region.

The electronic device in the present embodiment and the information processing method in the previous embodiments are two solutions of the same inventive concept. The implementation of the method has been described in detail. Those skilled in the art can learn the structure and implementation of the electronic device in the present embodiment based on the above description. This will be omitted here for clarity.

The Solutions of the embodiments of the present invention have at least the following advantages:

1. With the solution of detecting whether a preset deformation of the flexible display unit occurs, and when the preset deformation of the flexible display unit occurs, displaying a second content on the flexible display unit, the disadvantage can be avoided that the user cannot see a complete image due to the folded flexible display unit. After detecting a preset deformation of the flexible display unit occurs, a second content is displayed on the flexible display unit, and the second content is obtained by adjusting the first content based on the preset deformation. This solves the problem in the related art that the electronic device cannot detect that the flexible display unit has been folded, and thus an incomplete or distorted image may be displayed on the flexible display unit, leading to degraded user visual experience. Thus, the solution achieves the effect of providing to the user a complete image and improving the visual experience of the user.

2. With the solution of detecting whether a first deformation degree of of the flexible display unit is larger than a first threshold and smaller than a second threshold, and if so, displaying a prompt information to the user to indicate a bendable region, it is possible to, when a first preset deformation of the flexible display unit occurs, display on the flexible display unit a prompt information indicating a corresponding bendable region. Thus, the user can have user a good visual experience when the second region support the first region on a preset plane.

3. With the solution of detecting whether a second deformation degree of the flexible display unit is larger than a third threshold, and if so (that is, when a second preset deformation of the flexible display unit occurs), displaying the second content on the flexible display unit, it is possible to provide to the user a complete image and improve the visual experience of the user.

4. With the solution of displaying nothing on the second region when a second preset deformation of the flexible display unit occurs, and an angle between a first plane where the first region is located and a second plane where the second region is located is larger than 180°, it is possible to reduce power consumption and extend the lifetime of the electronic device.

It will be appreciated by those skilled in the art that the embodiments of the present invention can be provided as methods, systems or computer program products. Therefore, the present invention may be in a form of hardware, software, or combination of software and hardware. Furthermore, the present invention may be in a form of a computer program product implemented on one or more computer usable storage medium(s) (including but not limited to magnetic disk memory, CD-ROM, optical memory, etc.) containing computer usable program code.

The present invention is described by referring to flow charts and/or block diagrams of the methods, devices (systems) and computer program products according to the embodiments of the present invention. It should be understood that each flow and/or block of the flow chart diagrams and/or block diagrams, or combined flows and/or blocks of the flow chart diagrams and/or block diagrams may be implemented by computer program instructions. There computer program instructions may be provided to a general computer, a dedicated computer, an embedded processor or a processor of other programmable data processing devices to generate a machine, such that instructions executed by computers or processors of other programmable data processing devices generate appliances implementing functions specified in one or more flow(s) in flow chart diagrams and/or one or more block(s) in block diagrams.

There computer program instructions may be stored in a computer readable memory which can conduct computers or other programmable data processing devices to operate in a specific manner, such that instructions stored in the computer readable memory generate manufactures including instruction appliances, the instruction appliances implement functions specified in one or more flow(s) in flow chart diagrams and/or one or more block(s) in block diagrams.

There computer program instructions can also be loaded onto computers or other programmable data processing devices, such that a series of operation steps can be executed on computers or other programmable devices to generate computer implemented processing. Therefore, instructions executed on the computers or other programmable data processing devices provide steps of functions specified in one or more flow(s) in flow chart diagrams and/or one or more block(s) in block diagrams.

Apparently, various modifications and variations can be made by those skilled in the art without departing the spirit and scope of present invention. Thus, if modification and variations of the present invention fall into the scope of the claims of the present invention and equivalents thereof, the present invention also encompass such modification and variations.

What is claimed is:

1. An information processing method applied on an electronic device comprising a flexible display unit on which a first content is displayed, the method comprises:
   detecting whether a preset deformation of the flexible display unit occurs;
   when the preset deformation of the flexible display unit occurs, displaying, on the flexible display unit, a second content related or not related to the first content,
   wherein said detecting whether a preset deformation of the flexible display unit occurs comprises:
   detecting whether a first deformation degree of the flexible display unit is larger than a first threshold and smaller than a second threshold, wherein a first preset deformation of the flexible display unit occurs when the first deformation degree is larger than the first threshold and smaller than the second threshold; or
   detecting whether a second deformation degree of the flexible display unit is larger than a third threshold which is larger than the second threshold, wherein a second preset deformation of the flexible display unit occurs when the second deformation degree is larger than the third threshold, and the flexible display unit is divided into a first region and a second region which is able to support the first region on a preset plane.

2. The method of claim 1, wherein, when the first preset deformation of the flexible display unit occurs, displaying the second content on the flexible display unit comprises:
   displaying, on the flexible display unit, a prompt information indicating a bendable region.

3. The method of claim 2, wherein displaying the second content on the flexible display unit comprises:
   displaying, based on the first content, a first prompt information indicating a first bendable region on the flexible display unit;
   wherein, after the second preset deformation of the flexible display unit occurs along the first bendable region, at least part of the first content can be displayed in the first region.

4. The method of claim 2, wherein displaying the second content on the flexible display unit comprises:
   displaying, on the flexible display unit, a second prompt information indicating a second bendable region, the second prompt information corresponding to a first group of applications in the electronic device;
   wherein, after the second preset deformation of the flexible display unit occurs along the second bendable region, any application of the first group can be displayed in the first region.

5. The method of claim 1, wherein, when the second preset deformation of the flexible display unit occurs, displaying the second content on the flexible display unit comprises:
   displaying, on the flexible display unit, the second content based on an angle between a first plane where the first region of the flexible display unit is located and a second plane where the second region of the flexible display unit is located.

6. The method of claim 5, wherein, when the second preset deformation of the flexible display unit occurs, and the angle is smaller than 180°, displaying the second content on the flexible display unit comprises:
   displaying a first sub-content of the second content in the first region, and displaying a second sub-content of the second content in the second region, the first sub-content being different from the second sub-content.

7. The method of claim 5, wherein, when the second preset deformation of the flexible display unit occurs, and the angle is larger than 180°, displaying the second content on the flexible display unit comprises:
   displaying at least part of the second content in the first region, and displaying nothing in the second region.

8. The method of claim 7, wherein said displaying nothing in the second region comprises:
   obtaining M sub-display units located in the second region, M being an integer larger than or equal to 1;
   setting the M sub-display units to an off status so that nothing is displayed in the second region.

9. An electronic device, comprising:
   a housing;
   a flexible display unit provided on the housing, wherein a first content is displayed on the flexible display unit;
   a processor provided inside the housing and connected to the flexible display unit, configured to detect whether a preset deformation of the flexible display unit occurs, and when the preset deformation of the flexible display unit occurs, display, on the flexible display unit, a second content related or not related to the first content,
   wherein the processor is configured to detect whether a first deformation degree of the of the flexible display unit is larger than a first threshold and smaller than a second threshold, wherein a first preset deformation of the flexible display unit occurs when the first deformation degree is larger than the first threshold and smaller than the second threshold; or detect whether a second deformation degree of the flexible display unit is larger than a third threshold which is larger than the second threshold, wherein a second preset deformation of the flexible display unit occurs when the second deformation degree is larger than the third threshold, and the flexible display unit is divided into a first region and a second region which is able to support the first region on a preset plane.

10. The electronic device of claim 9, wherein the processor is configured to display, on the flexible display unit, a prompt information indicating a bendable region.

11. The electronic device of claim 10, wherein the processor is configured to display, based on the first content, a first prompt information indicating a first bendable region on the flexible display unit,
    wherein, after the second preset deformation of the flexible display unit occurs on along the first bendable region, at least part of the first content can be displayed in the first region.

12. The electronic device of claim 10, wherein the processor is configured to display, on the flexible display unit, a second prompt information indicating a second bendable region, the second prompt information corresponding to a first group of applications in the electronic device;
    wherein after the second preset deformation of the flexible display unit occurs along the second bendable region, any application of the first group can be displayed in the first region.

13. The electronic device of claim 9, wherein the processor is configured to display the second content on the flexible display unit based on an angle between a first plane where the first region of the flexible display unit is located and a second plane where the second region of the flexible display unit is located.

14. The electronic device of claim 13, wherein, when the second preset deformation of the flexible display unit occurs, and the angle is smaller than 180°, the processor is configured to display a first sub-content of the second content in the first region, and display a second sub-content of the second content in the second region, the first sub-content being different from the second sub-content.

15. The electronic device of claim 13, wherein, when the second preset deformation of the flexible display unit occurs, and the angle is larger than 180°, the processor is configured to display at least part of the second content in the first region, and display nothing in the second region.

16. The electronic device of claim 15, wherein the processor is configured to obtain M sub-display units located in the second region, M being an integer larger than or equal to 1, and set the M sub-display units to an off status so that nothing is displayed in the second region.

* * * * *